United States Patent [19]

Gregory et al.

[11] Patent Number: 5,759,248
[45] Date of Patent: Jun. 2, 1998

[54] MONOAZO COMPOUNDS

[75] Inventors: Peter Gregory, Bolton; Ronald Wynford Kenyon, Bridport; Paul Wight, Prestwich, all of United Kingdom

[73] Assignee: Zeneca Limited, London, England

[21] Appl. No.: 873,706

[22] Filed: Jun. 12, 1997

Related U.S. Application Data

[63] Continuation of Ser. No. 768,959, Dec. 18, 1996, abandoned.

[30] Foreign Application Priority Data

Dec. 19, 1995 [GB] United Kingdom ............ 9525886

[51] Int. Cl.$^6$ ................................. C09D 11/02
[52] U.S. Cl. ............................... 106/31.48; 534/803
[58] Field of Search ...................... 106/31.48; 534/803

[56] References Cited

U.S. PATENT DOCUMENTS

| | | | |
|---|---|---|---|
| 4,703,113 | 10/1987 | Baxter et al. | 106/22 K |
| 4,968,784 | 11/1990 | Imai et al. | 534/803 |
| 5,466,282 | 11/1995 | Eida et al. | 106/22 K |

FOREIGN PATENT DOCUMENTS

| | | |
|---|---|---|
| 176 195 | 4/1986 | European Pat. Off. . |
| 194 885 | 9/1986 | European Pat. Off. . |
| 2179361 | 3/1987 | United Kingdom ............ 534/803 |

OTHER PUBLICATIONS

Szadowski, J., et al., Triazin–Benzimidazolonsystem enthaltende Direktfarbstoffe, Textilveredlung, Dec. 1995, pp. 1096–1099, Melliand Textilber. (1995), Volume. Date 1995, 76(12), 1096–1099, E266–E267, no month available.

Jordinson et al., Identification of Newer Types of Reactive Dyes on Cellulosic Fibres–III, JSDC, Mar. 1972, pp. 117–122.

Hebeish, et al., Acid Catalyzed Reactive Dye For Cotton Part I: Preparation and Application, American Dyestuff Reporter, Nov. 1977, pp. 44–47 & 71.

Chemical Abstracts, vol. 85, abstr. No. 48259 & JP 10026386A Apr. 3, 1976 (Mitsubishi Chem. Indust.).

Abstract for Japanese Patent Application JP 06 099 656 A2, Canon, Apr. 1994.

Abstract for Japanese Patent Application JP 61 002 774 A2, Sumitomo, Jan. 1986.

Abstract for Japanese Patent Application JP 61 002 773 A2, Sumitomo, Jan. 1986.

Abstract for Japanese Patent Application JP 60 188 468 A2, Nippon Kayaku, Sep. 1985.

*Primary Examiner*—Helene Klemanski
*Attorney, Agent, or Firm*—Pillsbury Madison & Sutro LLP

[57] ABSTRACT

A monoazo compound of the Formula (1) and salts thereof:

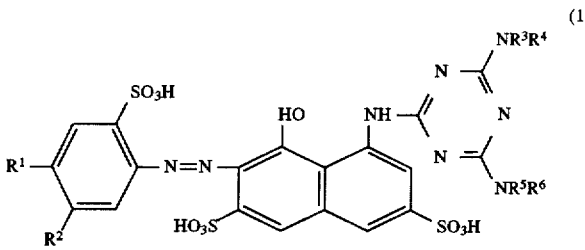

wherein each of $R^1$ and $R^2$, independently, represents H, halogen, alkyl, alkoxy or acylamino; each of $R^3$, $R^4$ and $R^5$, independently, represents H or optionally substituted hydrocarbyl other than groups comprising the residue —A'$NR^7R^8$ wherein A represents an optionally substituted alkylene group containing 2 or more carbon atoms and each of $R^7$ and $R^8$, independently, represents H or optionally substituted hydrocarbyl or $R^7$ and $R^8$ together with the attached nitrogen atom form a 5- or 6-membered ring and $R^6$ represents an optionally substituted hydrocarbyl group not comprising the residue —A—$NR^7R^8$ wherein A, $R^7$ and $R^8$ are as defined above; or $R^3$ and $R^4$ together with the attached nitrogen atom and/or $R^5$ and $R^6$ together with the attached nitrogen atom form a 5- or 6-membered ring other than a piperazine ring, the compounds of Formula (1) being free from fibre-reactive groups and any carboxyl substituents present in the compounds being attached in the form of one or more residue of the following formulae:

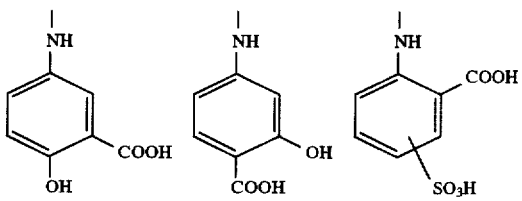

also claimed are ink compositions comprising the above compound; a process for printing substrates with the ink compositions using an ink-jet printer; paper, project slides and textile materials printed with the ink compositions; and a process for coloration of textile materials with the ink compositions.

6 Claims, No Drawings

MONOAZO COMPOUNDS

This is a continuation of application Ser. No. 08/768,959, filed on Dec. 18, 1996, which was abandoned upon the filing hereof.

This invention relates to chemical compounds and more particularly to coloured monoazo compounds to ink compositions and solutions thereof, and to processes for use in printing and imaging technologies, especially those suitable for coloration of substrates including paper, plastics, textiles, metal and glass such as inkjet printing.

Inkjet printing is a non-impact printing technique which involves ejecting, thermally or by action of an oscillating piezo crystal, droplets of ink continuously or on demand from a fine nozzle directly onto a substrate such as paper, plastics, textile, metal or glass. The ink may be aqueous, solvent or hot melt based and must provide sharp, non-feathered images which have good waterfastness, light fastness and optical density, have fast fixation to the substrate and cause no clogging of the nozzle.

According to a first aspect of the present invention, there are provided monoazo compounds of the Formula (1) and salts thereof:

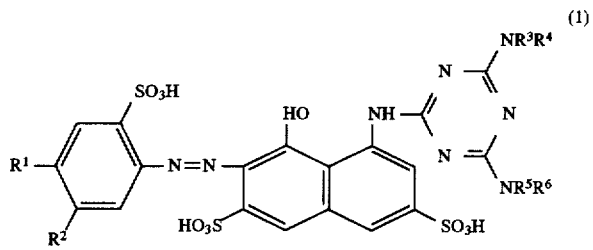

wherein each of $R^1$ and $R^2$, independently, represents H, halogen, alkyl, alkoxy or acylamino; each of $R^3$, $R^4$ and $R^5$, independently, represents H or optionally substituted hydrocarbyl other than groups comprising the residue —A—$NR^7R^8$ wherein A represents an optionally substituted alkylene group containing 2 or more carbon atoms and each of $R^7$ and $R^8$, independently, represents H or optionally substituted hydrocarbyl or $R^7$ and $R^8$ together with the attached nitrogen atom form a 5- or 6-membered ring and $R^6$ represents an optionally substituted hydrocarbyl group not comprising the residue —A—$NR^7R^8$ wherein A, $R^7$ and $R^8$ are as defined above; or $R^3$ and $R^4$ together with the attached nitrogen atom and/or $R^5$ and $R^6$ together with the attached nitrogen atom form a 5- or 6-membered ring other than a piperazine ring, the compounds of Formula (1) being free from fibre-reactive groups and any carboxyl substituents present in the compounds being attached in the form of one or more residue of the following formulae:

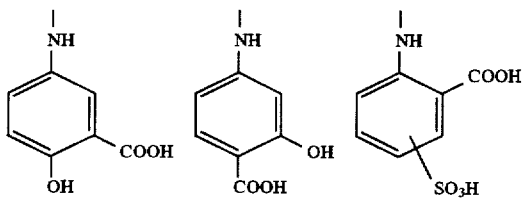

Halogen substituents which may be represented by $R^1$ and $R^2$ in the compounds of Formula 1 particularly include chloro substituents. Alkyl, alkoxy and acylamino substituents which may be represented by $R^1$ and $R^2$ particularly include $C_{1-6}$-alkyl groups, for example methyl, $C_{1-6}$-alkoxy groups; for example methoxy and $C_{1-6}$-acylamino groups, for example acetylamino.

Optionally substituted hydrocarbyl groups which may be represented by $R^3$, $R^4$, $R^5$ and $R^6$ include alkyl, substituted alkyl, alkenyl, substituted alkenyl, aryl and substituted aryl especially $C_{1-6}$-alkyl, substituted $C_{1-6}$-alkyl, $C_{3-4}$-alkenyl, phenyl and substituted phenyl. Any optional substituents on $R^3$, $R^4$, $R^5$ and $R^6$ are preferably independently selected from —OH and —$SO_3H$. When $R^3$ and $R^4$ together with the attached nitrogen atom and/or $R^5$ and $R^6$ together with the attached nitrogen atom form a 5- or 6-membered ring, they preferably form a morpholine or piperidine ring.

As indicated above, $R^3$, $R^4$, $R^5$ and $R^6$ must not be or contain groups of the formula —A—$NR^7R^8$ as defined. Thus, $R^3$, $R^4$, $R^5$ and $R^6$ must not be or contain groups such as aminoethyl or 3-dimethylaminopropyl.

As also stated above, the compounds of Formula 1 are free from fibre-reactive groups. Such groups have been fully described in the prior art, for example in our EP-A-0356014.

The compounds of Formula (1) may be in the free acid form as shown but are preferably in the form of water-soluble salts, especially alkali metal, ammonium or substituted ammonium salts.

The compounds of Formula (1) may be prepared by methods analogous to those described in the prior art for similar monoazo compounds. Thus, for example, a suitable method comprises:

(i) diazotising an aromatic amine of the formula:

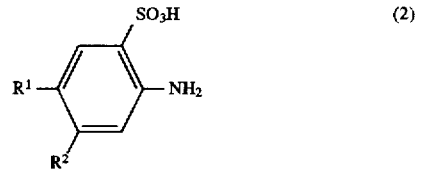

to form the corresponding diazonium salt;

(ii) condensing 8-amino-1-naphthol-3,6-disulphonic acid (H acid) with cyanuric chloride, preferably in the presence of a base, to form 8-(4,6-dichlorotriazin-2-ylamino)-1-naphthol-3,6-disulphonic acid;

(iii) coupling the diazonium salt with the dichlorotriazinylamino compound to form a monoazo compound of the formula:

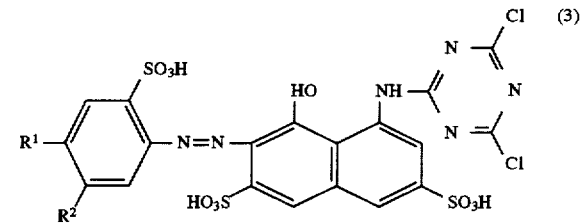

(iv) condensing the monoazo compound of Formula (3) with one molar proportion of a compound of formula $R^3R^4NH$, and (v) condensing the monoazo product from (iv) with one molar proportion of a compound of formula $R^5R^6NH$, preferably in the presence of a base;

wherein $R^1$, $R^2$, $R^3$, $R^4$, $R^5$ and $R^6$ are as defined above, the reactants being selected so that the final product is free from fibre-reactive groups and also so that any carboxyl substituents present in the product are in the form of one or more residue of the following formulae:

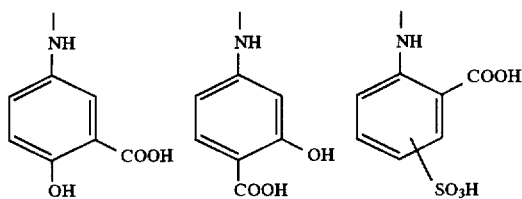

As examples of amines of Formula (2) which may be used in the preparation of compounds of Formula (1), there may be mentioned orthanilic acid, 2-amino-5-methylbenzenesulphonic acid, 2-amino-5-methoxybenzenesulphonic acid, 2-amino-5-acetylaminobenzenesulphonic acid and 2-amino-4,5-dimethylbenzenesulphonic acid.

As examples of compounds of formula $R^3R^4NH$ and formula $R^5R^6NH$, which may be the same or different, there may be mentioned ammonia and primary and secondary aliphatic and aromatic amines and heterocyclic bases such as morpholine provided not both are ammonia. Specific amines include 4-aminosalicylic acid, 2-amino-5-sulphobenzoic acid, 2-amino-5-methylbenzenesulphonic acid and ethanolamine.

The reactions leading to the formation of the compounds of the invention may be performed using conditions that have been fully described in the prior art for such reactions. Similarly, the compounds may be isolated by known methods, for example spray drying or precipitation and filtration.

According to a further feature of the present invention there is provided an ink composition comprising a monoazo compound of Formula (1) or salts thereof and a medium.

A compound of the present invention is a useful colorant for an ink, and exhibits high solubility in water and aqueous media and good water fastness and gives a print with a strong magenta shade on plain paper. The present ink composition may comprise a mixture of two or more different compounds of Formula (1) or salts thereof or may comprise a mixture of one or more compounds of Formula (1) or salts thereof with one or more other compounds such as other azo compounds. The compounds are versatile, exhibiting high water fastness and rapid fixation on alkaline, neutral and acid papers and good solubility in aqueous ink media.

A suitable ink composition comprises a compound according to the present invention and a liquid medium, preferably an aqueous medium. It is preferred that the compound is completely dissolved in the liquid medium to form a solution.

The ink composition preferably contains from 0.5% to 20%, more preferably from 0.5% to 15%, and especially from 1% to 3%, by weight of the compound based on the total weight of the ink. Although many inks contain less than 5% by weight of colorant, it is desirable that the compound has a water solubility of around 10% or more to allow the preparation of concentrates from which more dilute inks can be prepared and to minimise the chance of precipitation of colorant if evaporation of solvent occurs during use of the ink.

The liquid medium is preferably water or a mixture of water and one or more water-soluble organic solvent. The weight ratio of water to organic solvent(s) is preferably from 99:1 to 1:99, more preferably from 95:1 to 50:50 and especially from 90:10 to 60:40.

The water-soluble organic solvent is preferably selected from $C_{1-4}$-alkanols such as methanol, ethanol, n-propanol, isopropanol, n-butanol, sec-butanol, tert-butanol, isobutanol or n-pentanol; amides such as dimethylformamide or dimethylacetamide; ketones or ketone-alcohols such as acetone or diacetone alcohol; ethers such as tetrahydrofuran or dioxane; oligo- or poly-alkyleneglycols such as diethylene glycol, triethylene glycol, hexylene glycol, polyethylene glycol or polypropylene glycol; alkyleneglycols or thioglycols containing a $C_2$–$C_6$-alkylene group such as ethylene glycol, propylene glycol, butylene glycol, pentylene glycol or hexylene glycol and thiodiglycol; polyols such as glycerol or 1,2,6-hexanetriol; $C_{1-4}$-alkyl-ethers or polyhydric alcohols such as 2-methoxyethanol, 2-(2-methoxyethoxy)ethanol, 2-(2-ethoxyethoxy)-ethanol, 2-[2-(2-methoxyethoxy)ethoxy]ethanol, 2- [2- (2-ethoxyethoxy) - ethoxy]-ethanol, ethylene glycol monoallyl ether; heterocyclic ketones, such as 2-pyrrolidone and N-methyl-2-pyrrolidone, N-ethyl-2-pyrrolidone and 1,3-dimethylimidazolone and sulphoxides such as dimethylsulphoxide and sulpholane; or mixtures containing two or more of the aforementioned water-soluble organic solvents, for example thiodiglycol and a second glycol or diethylene glycol and 2-pyrrolidone.

Preferred water-soluble organic solvents are 2-pyrrolidone; N-methylpyrrolidone; alkylene glycols and oligo-alkylene glycols, such as ethylene glycol, diethylene glycol, triethylene glycol; and lower alkyl ethers of polyhydric alcohols such as 2-methoxy-2-ethoxy-2-ethoxyethanol; and polyethylene glycols with a molecular weight of up to 500. A preferred specific solvent mixture is a binary or ternary mixture of water and diethylene glycol and/or, 2-pyrrolidone or N-methylpyrrolidone in weight ratios 75-95:25-5 and 60-80:0-20:0-20 respectively.

Examples of suitable ink media are given in U.S. Pat. No. 4,963,189, U.S. Pat. No. 4,703,113, U.S. Pat. No. 4,626,284 and EP-A-0425150.

A further aspect of the present invention provides a process for printing a substrate with an ink composition using an ink jet printer, characterised in that the ink contains at least one compound according to the first aspect of the present invention.

A suitable process for the application of an ink as hereinbefore defined comprises forming the ink into small droplets by ejection from a reservoir through a small orifice so that the droplets of ink are directed at a substrate. This process is commonly referred to as ink jet printing, and preferred ink jet printing processes for the present inks are piezoelectric ink jet printing and thermal ink jet printing. In thermal ink jet printing, programmed pulses of heat are applied to the ink in the reservoir by means of a resistor adjacent to the orifice, during relative movement between the substrate and the reservoir.

The substrate used in the inkjet printing process may be paper, plastics, textile, metal or glass and is preferably paper, plastic or a textile material, especially a natural, semi-synthetic or synthetic material.

Examples of natural textile materials include wool, silk, hair and cellulosic materials, particularly cotton, jute, hemp, flax and linen.

Examples of synthetic and semi-synthetic materials include polyamides, polyesters, polyacrylonitriles and polyurethanes.

Preferred substrates include overhead projector slides or papers, including plain and treated papers, which may have an acid, alkaline or neutral character or textile materials such as cotton. An especially preferred substrate is paper.

The preferred ink used in the process is as hereinbefore described.

According to a further aspect of the present invention there is provided a paper or an overhead projector slide or textile material printed with an ink composition characterised in that the ink composition comprises at least one compound of Formula (1) or salt thereof.

According to a further aspect of the present invention there is provided a process for the coloration of a textile material with any of the abovementioned ink compositions which comprises the steps:

i) applying to the textile material by inkjet printing the ink composition; and ii) heating the textile material at a temperature from 50° C. to 250° C. to fix the compound on the material.

The process for coloration of a textile material by inkjet printing preferably comprises a pre-treatment of the textile material with an aqueous pre-treatment composition comprising a water-soluble base, a hydrotropic agent and a thickening agent followed by removing water from the pre-treated textile material to give a dry pre-treated textile material which is subjected to inkjet printing in step i) above.

The pre-treatment composition preferably comprises a solution of the base and the hydrotropic agent in water containing the thickening agent.

The base is preferably an inorganic alkaline base, especially a salt of an alkali metal with a weak acid such as an alkali metal carbonate, bicarbonate or silicate or an alkali metal hydroxide. The amount of base may be varied within wide limits provided sufficient base is retained on the textile material after pre-treatment to promote the dyeing of the pre-treated textile material. Where the base is sodium bicarbonate it is convenient to use a concentration of from 1% to 5% by weight based on the total weight of the composition.

The hydrotropic agent is present to provide sufficient water to promote the fixation reaction between the compound and the textile material during the heat treatment, in step (d) above, and any suitable hydrotropic agent may be employed. Preferred hydrotropic agents are urea, thiourea and dicyandiamide. The amount of hydrotropic agent depends to some extent on the type of heat treatment. If steam is used for the heat treatment generally less hydrotropic agent is required than if the heat treatment is dry, because the steam provides a humid environment. The amount of hydrotropic agent required is generally from 2.5% to 50% by weight of the total composition with from 2.5% to 10% being more suitable for a steam heat treatment and from 20% to 40% being more suitable for a dry heat treatment.

The thickening agent may be any thickening agent suitable for use in the preparation of print pastes for the conventional printing of cellulose reactive compounds. Suitable thickening agents include alginates, especially sodium alginate, xantham gums, monogalactam thickeners and cellulosic thickeners. The amount of the thickening agent can vary within wide limits depending on the relationship between concentration and viscosity. However, sufficient agent is preferred to give a viscosity from 10 to 1000 mPa.s, preferably from 10 to 100 mPa.s, (measured on a Brookfield RVF Viscometer). For an alginate thickener this range can be provided by using from 10% to 20% by weight based on the total weight of the pre-treatment composition.

The remainder of the pre-treatment composition is preferably water, but other ingredients may be added to aid fixation of the compound to the textile material or to enhance the clarity of print by inhibiting the diffusion (migration) of compound from coloured areas to non-coloured areas before fixation.

Examples of fixation enhancing agents are cationic polymers, such as a 50% aqueous solution of a dicyanamide/ phenol formaldehyde/ammonium chloride condensate e.g. MATEXIL FC-PN (available from ICI), which have a strong affinity for the textile material and the compound and thus increase the fixation of the compound on the textile material.

Examples of anti-migration agents are low molecular weight acrylic resins, e.g. polyacrylates, such as poly(acrylic acid) and poly(vinyl acrylate).

In the pre-treatment stage of the present process the pre-treatment composition is preferably evenly applied to the textile material. Where a deeply penetrated print or a deep shade is required the pre-treatment composition is preferably applied by a padding or similar process so that it is evenly distributed throughout the material. However, where only a superficial print is required the pre-treatment composition can be applied to the surface of the textile material by a printing procedure, such as screen or roller printing, ink jet printing or bar application.

In the pre-treatment stage of the present process, water may be removed from the pre-treated textile material by any suitable drying procedure such as by exposure to hot air or direct heating, e.g. by infra-red radiation, or micro-wave radiation, preferably so that the temperature of the material does not exceed 100° C.

The application of the ink composition to the textile material, stage (i) of the present process, may be effected by any ink Jet printing technique, whether drop on demand (DOD) or continuous flow. The ink composition, preferably also contains a humectant to inhibit evaporation of water and a preservative to inhibit the growth of fungi, bacteria and/or algae in the solution. Examples of suitable humectants are, propan-1,2-diol, butan-1,2-diol, butan-2,3-diol and butan-1, 3-diol. However, the presence of small amounts, up to about 10%, preferably not more than 5%, in total, of polyols having two or more primary hydroxy and/or primary alcohols is acceptable, although the composition is preferably free from such compounds. Where the ink jet printing technique involves the charging and electrically-controlled deflection of drops the composition preferably also contains a conducting material such as an ionised salt to enhance and stabilise the charge applied to the drops. Suitable salts for this purpose are alkali metal salts of mineral acids.

After application of the ink composition, it is generally desirable to remove water from the printed textile material at relatively low temperatures (<100° C.) prior to the heat applied to fix the compound on the textile material as this has been found to minimise the diffusion of the compound from printed to non-printed regions. As with the pre-treated textile material removal of water is preferably by heat, such as by exposure to hot air or to infra-red or micro-wave radiation.

In stage (ii) of the present process, the printed textile material is submitted to a short heat treatment, preferably after removal of water by low-temperature drying, at a temperature from 100° C. to 200° C. by exposure to dry or steam heat for a period of up to 20 minutes. If a steam (wet) heat treatment is used, the printed material is preferably maintained at 100°–105° C. for from 5 to 15 minutes whereas if a dry heat treatment is employed the printed material is preferably maintained at 140°–160° C. for from 2 to 8 minutes.

After allowing the textile material to cool, unfixed compound and other ingredients of the pre-treatment and compound compositions may be removed from the textile material by a washing sequence, involving a series of hot and cold washes in water and aqueous detergent solutions before the textile material is dried.

According to further aspects of the present invention there are provided textile materials, especially cellulosic textile materials, coloured with any of the ink compositions according to the present invention or by means of the process according to the present invention.

The invention is further illustrated but not limited by the following examples.

EXAMPLE 1

2-Amino-5-methylbenzenesulphonic acid (9.4 g) was dissolved in water (200 cm$^3$) and the pH was adjusted to 7 by the addition of 2N sodium hydroxide solution. Sodium nitrite (3.8 g) was added and the whole solution was added to a mixture of ice/water/concentrated HCl (25 cm$^3$) at 0°–5° C.

1-Amino-8-naphthol-3,6-disulphonic acid (20.0 g) was dissolved in water (400 cm$^3$) and the pH was adjusted to 6 by the addition of 2N sodium hydroxide solution.

Cyanuric chloride (10.0 g) was added to acetone/ice/water at 0°–5° C. and the H acid solution was added to this over 5 mins at 0°–5° C. After stirring for 2 hours, the solution was filtered and then added to the diazo solution prepared as described above.

The pH of the coupling reaction was adjusted to 7 over 1 hr by the addition of 2N sodium hydroxide solution. Stirring was continued for a further 2 hours at pH 7 and the total volume was adjusted to 1200 cm$^3$.

To 600 cm$^3$ of the above prepared solution of dichlorotriazinyl monoazo compound was added 4-aminosalicylic acid (3.8 g) and stirring was maintained overnight at pH 6–7. The monochlorotriazinyl azo compound so formed was salted out by the addition of 20% sodium chloride solution, filtered off, washed with brine (500 cm$^3$) and dried in a vacuum oven.

The monochlorotriazinylazo compound (8.3 g) was dissolved in water, ethanolamine (1.8 g) was added and the reaction mixture was heated to 70°–75° C. for 3 hours. After cooling and dialysis, the product was dried at 70° C. overnight.

When dissolved in an aqueous ink medium and printed on to plain paper using a thermal ink jet printing machine, the product gave bright magenta shades having good water fastness and good light fastness.

The following table gives further examples of monoazo compounds of the formula

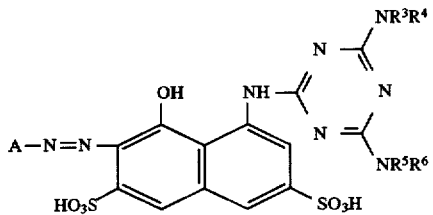

which were prepared by coupling a diazotised aromatic amine ANH$_2$ with dichlorotriazinyl H acid and then reacting the dichlorotriazinyl monoazo compound first with a compound of the formula HNR$^3$R$^4$ and second with a compound of the formula HNR$^5$R$^6$.

| Example | ANH$_2$ | HNR$^3$R$^4$ | HNR$^5$R$^6$ |
|---|---|---|---|
| 2 | 2-amino-5-methyl benzene sulphonic acid | 2-amino-5-sulpho benzoic acid | ammonia |
| 3 | orthanilic acid | 4-amino salicylic acid | ethanolamine |
| 4 | 2-amino-4,5-dimethyl benzene sulphonic acid | 2-amino-5-sulpho benzoic acid | ethanolamine |
| 5 | 2-amino-4,5-dimethyl benzene sulphonic acid | 4-amino salicylic acid | ethanolamine |
| 6 | 2-amino-4,5-dimethyl benzene sulphonic acid | ethanolamine | ethanolamine |
| 7 | 2-amino-4,5-dimethyl benzene sulphonic acid | 4-aminosalicylic acid | 2-aminomethyl tetrahydrofuran |
| 8 | 2-amino-4,5-dimethyl benzene sulphonic acid | 4-aminosalicylic acid | ammonia |
| 9 | 2-amino-5-methoxy benzene sulphonic acid | 4-aminosalicylic acid | ethanolamine |
| 10 | 2-amino-5-methoxy benzene sulphonic acid | 2-amino-5-sulpho benzoic acid | ethanolamine |

When dissolved in an aqueous ink medium and printed on to plain paper using a thermal ink jet printing machine, the compounds of Examples 2–10 gave results similar to those given by the product of Example 1.

We claim:

1. A monoazo compound of the Formula (1) and salts thereof:

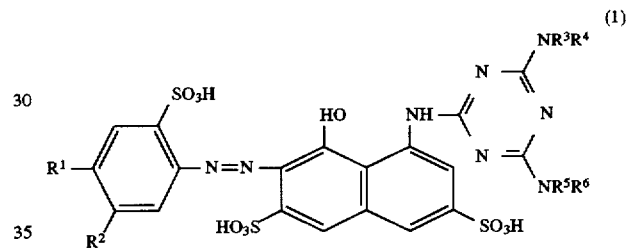

wherein:

each of R$^1$ and R$^2$, independently, represents H, halogen, alkyl or acylamino;

each of R$^3$, R$^4$ and R$^5$, independently, represents H, C$_{1-6}$-alkyl substituted by —OH or —SO$_3$, H, C$_{1-6}$-alkenyl, substituted C$_{1-6}$-alkenyl, aryl or substituted aryl, other than groups comprising the residue —A—NR$^7$R$^8$ wherein A represents an optionally substituted alkylene group containing 2 or more carbon atoms and each of R$^7$ and R$^8$, independently, represents H or optionally substituted hydrocarbyl or R$^7$ and R$^8$ together with the attached nitrogen atom form a 5- or 6-membered ring; and R$^6$ represents a group selected from C$_{1-5}$-alkyl, C$_{1-6}$-alkenyl, substituted C$_{1-6}$-alkenyl and aryl substituted by one or more substituents selected from —OH, —COOH and —SO$_3$H, other than groups comprising the residue —A—NR$^7$R$^8$ wherein, A, R$^7$ and R$^8$ are as defined above; or R$^3$ and R$^4$ together with the attached nitrogen atom and/or R$^5$ and R$^6$ together with the attached nitrogen atom form a 5- or 6-membered ring other than a piperazine ring;

the compounds of Formula (1) being free from fibre-reactive groups and any carboxyl substituents present in the compounds being attached in the form of one or more residue of the following formulae:

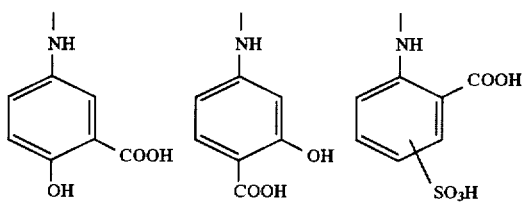

2. An ink composition comprising a solution of a compound or salts thereof according to claim 1 in an aqueous medium.

3. A process for printing a substrate with an ink composition comprising forming the ink into small droplets by ejection from a reservoir through a small orifice so that the droplets are directed at a substrate wherein the ink composition comprises at least one compound or salt thereof according to claim 1 in an aqueous medium.

4. A paper or an overhead projector slide or textile material printed with an ink composition wherein the ink composition comprises at least one compound or salt thereof according to claim 1.

5. A process for the coloration of a textile material with an ink composition comprising a compound or salt thereof according to claim 1 which comprises the steps:

i) applying to the textile material by inkjet printing the ink composition; and ii) heating the textile material at a temperature from 50° C. to 250° C. to fix the compound on the material.

6. A textile material coloured with an ink composition according to claim 2.

* * * * *